(12) United States Patent
Ishibashi et al.

(10) Patent No.: US 8,279,540 B2
(45) Date of Patent: Oct. 2, 2012

(54) COMPOUND LENS AND OPTICAL SYSTEM INCLUDING THE SAME

(75) Inventors: Tomohiko Ishibashi, Utsunomiya (JP); Satoshi Maetaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 165 days.

(21) Appl. No.: 12/916,396

(22) Filed: Oct. 29, 2010

(65) Prior Publication Data

US 2011/0122513 A1 May 26, 2011

(30) Foreign Application Priority Data

Nov. 25, 2009 (JP) ................................. 2009-267152

(51) Int. Cl.
*G02B 9/00* (2006.01)

(52) U.S. Cl. ........................................................ 359/797
(58) Field of Classification Search .................. 359/796, 359/797

See application file for complete search history.

(56) References Cited

U.S. PATENT DOCUMENTS

| | | | |
|---|---|---|---|
| 4,679,918 A * | 7/1987 | Ace | 351/159.62 |
| 6,421,190 B1 * | 7/2002 | Abe | 359/796 |
| 7,292,398 B1 | 11/2007 | Misaka | |
| 7,931,833 B2 * | 4/2011 | Miyakawa et al. | 359/642 |
| 2007/0139794 A1 | 6/2007 | Misaka | |
| 2010/0116973 A1 * | 5/2010 | Maetaki | 359/796 |

FOREIGN PATENT DOCUMENTS

| JP | 5-337959 A | 12/1993 |
|---|---|---|
| JP | 2007-163964 A | 6/2007 |

* cited by examiner

*Primary Examiner* — Ricky Mack
*Assistant Examiner* — Zachary Wilkes
(74) *Attorney, Agent, or Firm* — Rossi, Kimms & McDowell LLP

(57) ABSTRACT

A compound lens comprises three or more optical elements, including first, second, and third optical components, that are cemented together. The material of the second optical element is an organic composite material. The first optical element is cemented to one surface of the second optical element. The third optical element is disposed remotest from the first optical element in an optical axis. The diameters of effective areas of the first optical element on the cemented surface between the first and the second optical elements, and of the second optical element, and the distance ti($\phi$) between optically effective surfaces of the i-th optical element (i=1, 2, 3) along the optical axis at diameter $\phi$ are appropriately designed. The second optical element has such a shape that the decrease in the distance between its optically effective surfaces is small in a region outside the effective surface area.

8 Claims, 8 Drawing Sheets

COMPOUND LENS AND OPTICAL SYSTEM INCLUDING THE SAME

BACKGROUND OF THE INVENTION

1. Field of the Invention

The present invention relates to a compound lens in which three or more optical elements are cemented together and an optical system including the same. The present invention can suitably be applied to optical apparatuses such as film cameras, digital still cameras, video cameras, telescopes, binoculars, projectors, and digital copying machines.

2. Description of the Related Art

Optical systems (image taking optical systems) for use in optical apparatuses such as digital cameras and video cameras developed in recent years are required to have high performance and to be small in overall size and light in overall weight. Generally speaking, a reduction in the size of an optical system tends to lead to larger aberrations, in particular larger chromatic aberrations including longitudinal chromatic aberration and lateral chromatic aberration, whereby optical performance is deteriorated. It is difficult to achieve high performance and reduction in size and weight at the same time in optical systems using only existing optical materials or glasses.

Known methods of solving the above-described problem include correcting aberrations using a compound aspherical lens and correcting aberrations using a compound lens in which an organic-inorganic composite material is used (see Japanese Patent Application Laid-Open No. H05-337959 and Japanese Patent Application Laid-Open No. 2007-163964).

Japanese Patent Application Laid-Open No. H05-337959 discloses a compound aspherical lens produced by forming an aspheric surface by molding an organic composite material on a surface of a spherical lens made of a glass material.

Japanese Patent Application Laid-Open NO. 2007-163964 discloses a compound lens using an organic composite material having anomalous partial dispersion.

The optical element disclosed in Japanese Patent Application Laid-Open No. H05-337959 and Japanese Patent Application Laid-Open No. 2007-163964 does not necessarily have satisfactory heat resistance or environmental resistance as compared to optical elements made of only inorganic glass materials.

More specifically, in compound aspherical lenses in which a synthetic resin layer is provided by molding to make a spherical lens surface aspherical, since the synthetic resin layer is exposed to the atmosphere, the surface shape and optical characteristics tends to change with environmental changes such as changes in the temperature and humidity. Furthermore, if the hardness of the synthetic resin layer is low, it can easily be scratched, and/or there is a risk of cracking. Although compound lenses can easily designed to have no optically effective surface of an organic composite material that is exposed to the atmosphere, it is apt to be affected by humidity and temperature through its edge that is exposed to the atmosphere. To improve the environmental resistance, it is effective to make the area of the edge that is exposed to the atmosphere smaller.

However, the optical element disclosed in Japanese Patent Application Laid-Open No. H05-337959 and Japanese Patent Application Laid-Open No. 2007-163964 does not necessarily have a design excellent enough to improve the environmental resistance.

SUMMARY OF THE INVENTION

An object of the present invention is to provide a compound lens that is easy to manufacture and has good environmental resistance in which aberrations such as chromatic aberrations can be corrected and to provide an optical system including such a compound lens.

A compound lens according to the present invention comprises three or more optical elements, including first, second, and third optical components, that are cemented together into an integral component, wherein the material of the second optical element is an organic composite material, the first optical element is cemented to one surface of the second optical element, the third optical element is disposed remotest from the first optical element in an optical axis, the following conditions are satisfied:

$$\phi 1ea \leq \phi 2ea < \phi 2,$$

$$t2(\phi 1ea)/t2(0) < 1.0, \text{ and}$$

$$t2(\phi 1ea)/\{t1(\phi 1ea)+t3(\phi 1ea)\} < 0.20,$$

where $\phi 1ea$ is a diameter of an effective surface area of the first optical element on the cemented surface between the first optical element and the second optical element, $\phi 2ea$ is a diameter of an effective surface area of the second optical element, $\phi 2$ is an outer diameter of the second optical element, and $ti(\phi)$ is a distance between optically effective surfaces of the i-th optical element (i=1, 2, 3) along the optical axis direction at diameter $\phi$, and the second optical element has such a shape that a decrease in the distance between its optically effective areas along the optical axis direction is small in a region outside the effective surface area.

According to the present invention, a compound lens that is easy to manufacture and has good environmental resistance in which aberrations such as chromatic aberrations can be corrected and an optical system including such a compound lens can be achieved.

Further features of the present invention will become apparent from the following description of exemplary embodiments with reference to the attached drawings.

DESCRIPTION OF THE EMBODIMENTS

Figure 1:
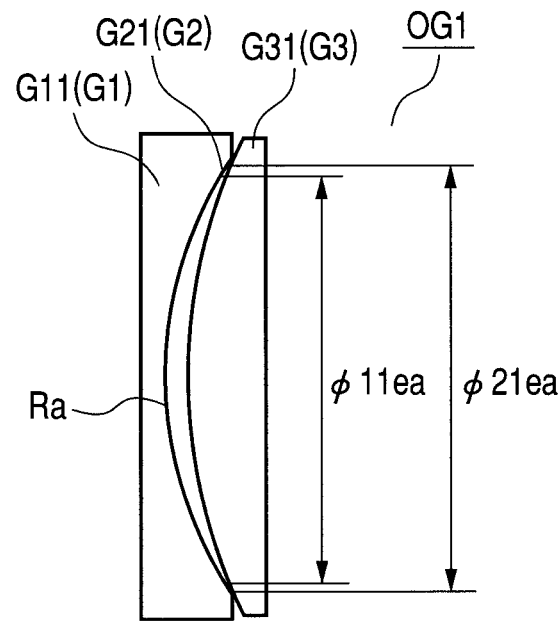
FIG. 1 is a cross sectional view of a relevant portion of a compound lens according to a first embodiment of the present invention.

Preferred embodiments of the present invention will now be described in detail in accordance with the accompanying drawings.

The compound lens as an optical element according to the present invention is comprised of three or more optical elements including first, second, and third optical elements that are cemented together into an integral component. The optical elements are cemented to each other by a binder such as an adhesive. The material of the second optical element is an organic composite material. The first optical element is cemented on one surface of the second optical element. The third lens element is disposed remotest from the first optical element in the direction of the optical axis.

The compound lens according to the present invention is manufactured through a process of forming the second optical element on an effective surface of an optical element other than the first optical element and a process of cementing the first optical element to an effective surface of the second optical element to which no optical element other than the first optical element is cemented.

The optical element in the context of the present invention refers to an optical element that is made of an inorganic material such as a glass, a plastic material, or a resin etc. and has a substantial refracting effect. The optical material mentioned herein does not include an adhesive layer that cements a plurality of optical elements and does not have a substantial optical power, nor a thin film or coating material provided for anti-reflection or improvement of adhesiveness.

The organic composite material in the context of the present invention refers to a cured resin material, or a material obtained by dispersing inorganic fine particles in an organic material and curing it. Specifically, it refers to an acrylic, polycarbonate, and polyvinyl carbazole, and mixtures of one or some of them and other organic or inorganic material(s).

Organic composite materials, one of which the second optical element is made, generally show larger environmental changes as compared to inorganic materials such as glasses. The organic composite material can easily deform with a change in the temperature of the atmosphere (air). For example, at high temperature, the organic composite material tends to deform by expansion, and changes in optical characteristics such as the refractive index are likely to occur. Furthermore, at high humidity, deformation of the surface shape tends to be caused by water absorption, and changes in optical characteristics tend to be large.

In the compound lens according to the present invention, the first lens element is cemented to one surface of the second optical element, and the third lens element is cemented, via another optical element in some cases, to the other surface of second optical element. Therefore, the optically effective surfaces of the second optical element will not be exposed to the atmosphere, and environmental changes can be prevented from occurring.

However, since the edge of the second optical element is exposed to the atmosphere, the area of the edge of the second optical element that is exposed to the atmosphere may be made small in order to control changes under the environment. To this end, it is desirable that the distance between the optically effective surfaces or areas along the optical axis or the size of the optical element along the optical axis (i.e. the thickness of the optical element) be made smaller.

In the compound lens according to the present invention, the following condition is satisfied (claim 1):

$$\phi 1ea \leq \phi 2ea < \phi 2 \qquad (1),$$

where $\phi 1ea$ is the diameter of the effective surface area of the first optical element on the cemented surface between the first optical element and the second optical element, $\phi 2ea$ is the diameter of the effective surface area of the second optical element, and $\phi$ is the outer diameter of the second optical element.

According to the present invention, a plurality of compound lenses each of which having three or more optical elements including the first, second, and third optical elements may be provided in one optical system. If this is the case, the above condition (1) is replaced by the following condition:

$$\phi 1jea \leq \phi 2jea < \phi 2j \qquad (1').$$

Here, the suffix "j" is used to designate the diameter of the effective surface area, outer diameter, and the distance between the effective surfaces or areas etc. of an optical element in the j-th compound lens among a plurality of compound lenses. This also applies to the following description.

In the following, the technical meaning of the above condition (1) will be discussed. In this connection, the optically effective surface in the context of the present invention refers to a boundary surface through which rays pass when the lens is in use and its extension surface having the same shape. The optically effective surface is a lens surface in most cases, and it does not includes a surface by which the optical element is held and that does not constitute a lens surface nor the edge portion of the optical element. The diameter of the effective surface area refers to the maximum diameter (inner diameter) of the optically effective surface. The outer diameter refers to the maximum diameter of the optical element including the optically non-effective surface.

In the case where the second optical element is molded using a molding unit such as a mold, the outer diameter $\phi 2$ of the second optical element is made larger than the diameter of the effective surface area $\phi 1ea$ of the first optical element at the interface of the first optical element and the second optical element. This facilitates controlling influences of unwanted light that is refracted, reflected, and scattered through the edge of the second optical element. In the case where a preformed second optical element is cemented to the first optical element also, satisfying condition (1) facilitates similar advantageous effects.

According to the present invention, the following conditions are further satisfied:

$$t2(\phi 1ea)/t2(0) < 1.0 \qquad (2), \text{ and}$$

$$t2(\phi 1ea)/\{t1(\phi 1ea)+t3(\phi 1ea)\} < 0.20 \qquad (3),$$

where $\phi$ is the diameter or height from an optical axis of each of optical elements, and $ti(\phi)$ is the distance between the optically effective surfaces of the i-th optical element (i=1, 2, 3) along the optical axis at the diameter $\phi$.

The distance $ti(\phi)$ between the optically effective surfaces represents, for example, the thickness of each optical element along the optical axis, which will be simply referred to as the "thickness" in some cases. In connection with the above, $ti(0)$ represents the thickness of the i-th optical element on the optical axis in a coaxial compound (or cemented) lens. In cases where there is a plurality of compound lenses, the above conditions (2) and (3) are replaced by the following conditions:

$$t2j(\phi 1jea)/t2j(0)<1.0 \qquad (2'), \text{ and}$$

$$t2j(\phi 1jea)/\{t1j(\phi 1jea)+t3j(\phi 1jea)\}<0.20 \qquad (3'),$$

where j=1, 2, 3, ..., n.

In the following, the technical meaning of the above conditions (2) and (3) will be discussed. Condition (2) states that the thickness of the second optical element at the position of the effective area is small relative to the thickness on the optical axis. For example, if the incidence and exit surfaces are both in contact with air, the refractive power can be positive in some configurations. The compound lens according to the present invention can easily be applied to configurations that satisfy condition (2)

Condition (3) limits the thickness of the second optical element relative to the thickness of the first lens element and the thickness of the third lens element. If the numerical limitation of condition (3) is satisfied, changes in the environmental resistance can be controlled, and the application of the compound lens according to the present invention is facilitated. If condition (3) is satisfied, influences of changes in the second optical element caused by environmental changes can be reduced by the rigidity of the first and third optical elements. In consequence, it becomes easy to achieve a compound lens having good environmental resistance.

In the present invention, the second optical element has such a shape that the decrease in the thickness in the optical axis direction outside the effective surface area is small. As described above, in order to reduce influences of unwanted light through the edge of the second lens element, it is necessary that condition (1) be satisfied. In addition, since there are variation in the diameter of the optical element due to manufacturing error, it is necessary that the outer diameter of the second optical element be larger than the diameter of the effective surface area of the first optical element. Then, in order to facilitate manufacturing, the outer diameter of the second optical element should be made larger relative to the effective surface area of the first optical element. On the other hand, in order to achieve size reduction, it is preferred that the outer diameter be made as small as possible.

Furthermore, in order to make the thickness of the second optical element smaller to improve the environmental resistance, the second lens element should be designed to have such a shape that the decrease in the distance between the optically effective surfaces in the optical axis direction outside the effective surface area of the second optical element is small. From the viewpoint of environmental resistance, it is more preferred that the numerical range of condition (3) be further limited as follows:

$$t2(\phi 1ea)/\{t1(\phi 1ea)+t3(\phi 1ea)\}<0.175 \qquad (3a).$$

It is still more preferred that the numerical range of condition (3a) be further limited as follows:

$$t2(\phi 1ea)/\{t1(\phi 1ea)+t3(\phi 1ea)\}<0.150 \qquad (3b).$$

It is still more preferred that the numerical range of condition (3b) be further limited as follows:

$$t2(\phi 1ea)/\{t1(\phi 1ea)+t3(\phi 1ea)\}<0.125 \qquad (3c).$$

It is still more preferred that the numerical range of condition (3c) be further limited as follows:

$$t2(\phi 1ea)/\{t1(\phi 1ea)+t3(\phi 1ea)\}<0.100 \qquad (3d).$$

In the present invention, the diameter of the second optical element outside the effective surface area is delimited by the following differential formula:

$$dt2(\phi 2ea)/d\phi < dt2(\phi 2ext)/d\phi \qquad (4),$$

where $\phi 2ext$ is the diameter of the second optical element outside the effective surface area and defined as follows:

$$\phi 2ea < \phi 2ext \leq \phi 2 \qquad (5).$$

In the case of an optical element having a positive refractive power that satisfies condition (2), the thickness monotonically decreases along the radial direction. In the present invention, as condition (4) is satisfied, the second optical element has such a shape that the decrease in the thickness in the optical axis direction is small in the region outside the effective surface area of the second optical element.

In cases where a curvature changes discontinuously, the aforementioned derivative cannot be defined. In such cases, a left differential coefficient and right differential coefficient may be obtained by using limit instead of derivative. Specifically, it is preferred that the following condition (6) be satisfied:

$$\lim_{\Delta r \to 0-} \frac{t_2(\phi_{2ea} + \Delta r) - t_2(\phi_{2ea})}{\Delta r} < \lim_{\Delta r \to 0+} \frac{t_2(\phi_{2ext} + \Delta r) - t_2(\phi_{2ext})}{\Delta r}, \qquad (6)$$

where $\Delta y$ is the change in the outer diameter. As described before, while in order to reduce influences of unwanted light through the edge of the second optical element it is necessary that condition (1) be satisfied, in order to achieve size reduction it is preferred that the maximum diameter of each optical element be small. Then, it is desirable that the ratio of the diameter of the effective surface area $\phi 1ea$ of the first optical element and the outer diameter $\phi 2$ of the second optical element fall within the following numerical range:

$$\phi 1ea/\phi 2 \geq 0.80 \qquad (7).$$

It is more preferred that the numerical range of condition (7) be further limited as follows:

$$\phi 1ea/\phi 2 \geq 0.85 \qquad (7a).$$

It is more preferred that the numerical range of condition (7a) be further limited as follows:

$$\phi 1ea/\phi 2 \geq 0.90 \qquad (7b).$$

Satisfying the above conditions facilitates designing a compound lens that has good environmental resistance and is easy to manufacture. In the present invention, the cemented surface between the first optical element and the second optical element has a shape having different curvature radii in the region inside the effective surface area and the region outside the effective surface area. In the following, embodiments of the compound lens will be described.

First Embodiment

FIG. 1 is a cross sectional view showing a relevant portion of a compound lens according to a first embodiment of the present invention. In FIG. 1, the j-th compound lens is denoted by OGj, the first optical element, the second optical element, and the third optical element that constitute the compound lens OGj are denoted by G1j, G2j, and G3j (j=1, 2, 3, . . . , n) respectively. This also applies to the other embodiments described later. FIG. 1 illustrates the first compound lens OG1 (j=1).

In this embodiment, the first optical element G11 and the third optical element G31 are made of an inorganic glass. The second optical element G21 is made of a UV curing resin and has a meniscus shape providing a positive refractive power. The thickness of the second optical element G21 in the optical axis direction decreases from the optical axis toward the periphery. In this embodiment, the first optical element G11 is cemented to the light incidence surface of the second optical element G21, and the third optical element G31 is cemented to the light exit surface of the second optical element G21. The compound lens OG1 is composed of these three optical elements G11, G21, G31.

In this embodiment, on the cemented surface Ra between the first optical element G11 and the second optical element G21, the diameter of the effective surface area $\phi 11ea$ of the first optical element G11 is smaller (or shorter) than the diameter of the effective surface area $\phi 21ea$ of the second optical element G21. This reduces influences of unwanted light that is refracted, reflected, and scattered through the edge of the second optical element G21.

Figure 2:
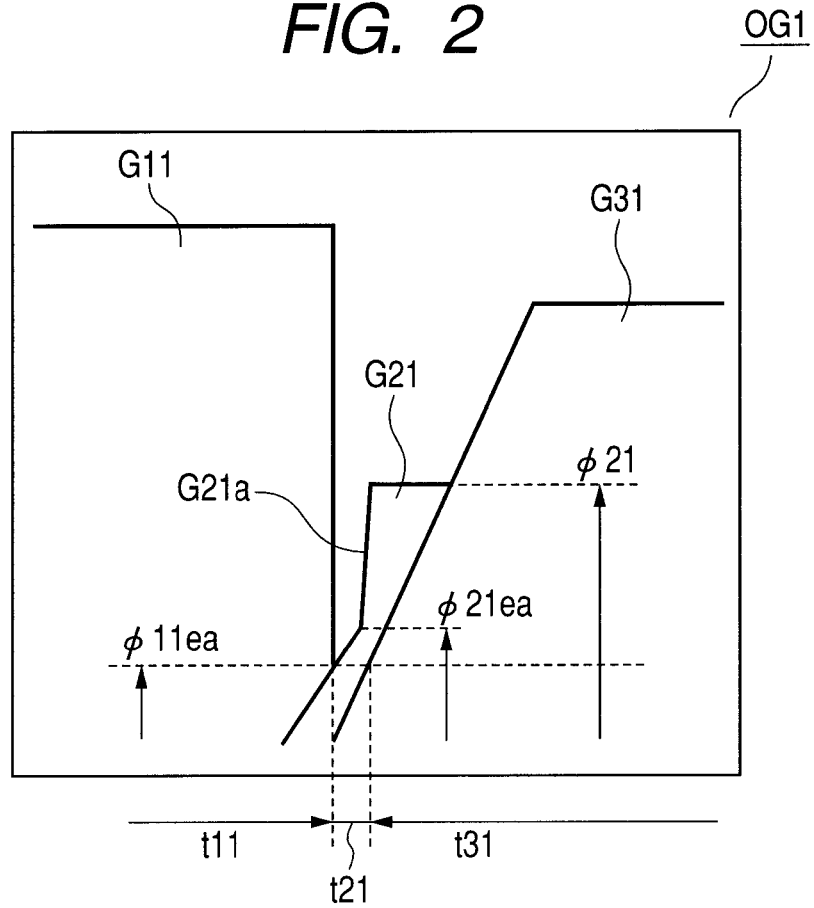
FIG. 2 is an enlarged view showing an edge portion of the compound lens according to the first embodiment of the present invention.

FIG. 2 is an enlarged view showing an edge portion of the compound lens OG1 according to the first embodiment of the present invention in an enlarged manner. In FIG. 2, the diameter of the effective surface area of the first optical element of the compound lens OG1 is denoted by $\phi 11ea$, the diameter of the effective surface area of the second optical element is denoted by $\phi 211ea$, and the outer diameter of the second optical element is denoted by $\phi 21$. This also applies to the other embodiment that will be described later.

In this embodiment, the thickness $t21(\phi 11ea)$ of the second optical element G21 at the diameter of the effective surface area $\phi 11ea$ is smaller than the thickness $t11(\phi 11ea)$ of the first optical element G11 and the thickness $t31(\phi 11ea)$ of the third optical element G31 ($t21<t11$, and $t21<t31$). In this embodiment, the environmental resistance is enhanced by this feature.

Furthermore, in this embodiment, the curvature radius is locally changed in the region G21a of the surface of the second optical element G21 outside the effective surface area (i.e. in the optically non-effective surface). Thus, the decrease in the thickness (or distance) of the second optical element G21 in the optical axis direction in the region outside the effective surface area (peripheral region) is made small.

Figure 14:
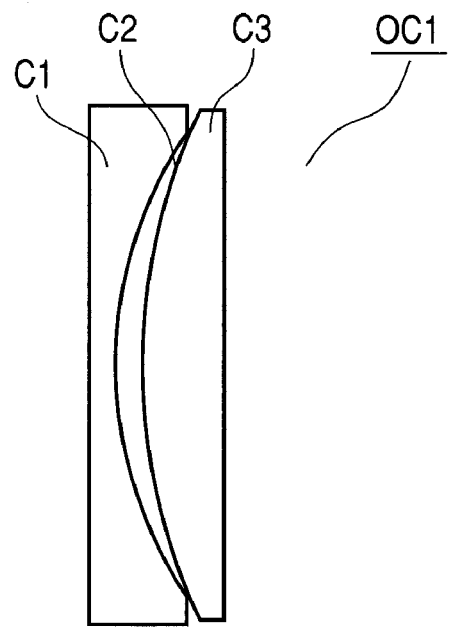
FIG. 14 is a cross sectional view of a relevant portion of a conventional compound lens.

FIG. 14 is a cross sectional view showing a relevant portion of a conventional compound lens. The compound lens OC1 shown in FIG. 14 is composed of a first optical element C1, a second optical element C2, and a third optical element C3, and the curvature radii of their optically effective surfaces or areas are the same as those of the compound lens according to the first embodiment.

Figure 15:
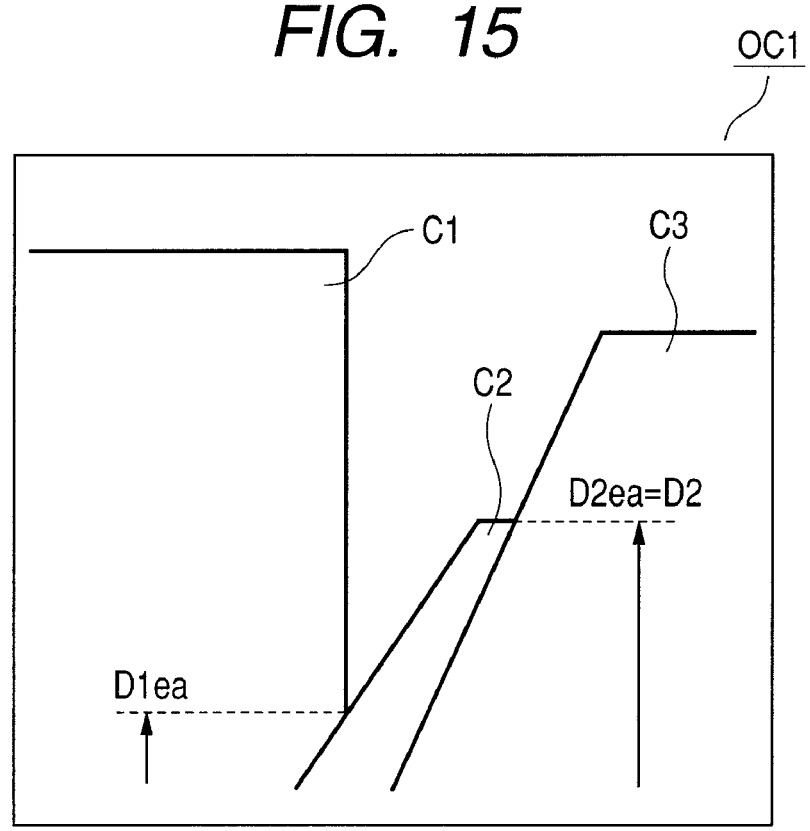
FIG. 15 is an enlarged view of an edge portion of the conventional compound lens.

FIG. 15 is an enlarged view of an edge portion of the conventional compound lens shown in FIG. 14. FIG. 15 illustrates the diameter of the effective surface area D1ea of the first optical element C1 of the compound lens OC1 and the diameter of the effective surface area D2ea (or outer diameter D2) of the second optical element C2. The second optical element C2 of the compound lens OC1 shown in FIG. 15 is not configured in such a way that the decrease of the thickness in the optical axis direction is made small in the region outside the effective surface area of the cemented surface between the first optical element C1 and the second optical element C2.

In this embodiment, the volume of the portion of the second optical element G2j (G21) inside the diameter of the effective surface area $\phi 1jea$ ($\phi 11ea$) of the cemented surface between the first optical element G1j (G11) and the second optical element G2j (G21) will be referred to as volume a. In addition, the volume of the portion of the second optical element G2j (G21) outside the diameter of the effective surface area $\phi 1jea$ ($\phi 11ea$) will be referred to as volume b. Then, the ratio of the volumes b/a will be referred to as the "outside/inside volume ratio" of the second optical element G2j (G21). The larger the outside/inside volume ratio is, the more easily influences of manufacturing errors in the radial direction of the second optical element G2j (G21) can be made. However, the larger the outside/inside volume ratio is, the more the thickness in the optical axis direction tends to increase. Therefore, there has been a trade-off between the environmental resistance and the ease of manufacturing.

The outside/inside volume ratio of the second optical element G21 in this embodiment is 0.020, and the outside/inside volume ratio in the conventional lens is 0.020. Then, the thickness of the second optical element G21 in the optical axis direction in the optically effective surface (with the diameter of the effective surface area $\phi 21ea$) can easily be made smaller than the thickness of the second optical element C21 in the conventional lens shown in FIG. 15. Therefore, there can be provided a compound lens that has good environmental resistance and is easy to manufacture and in which aberrations such as chromatic aberration can easily be corrected.

Second Embodiment

Figure 3:
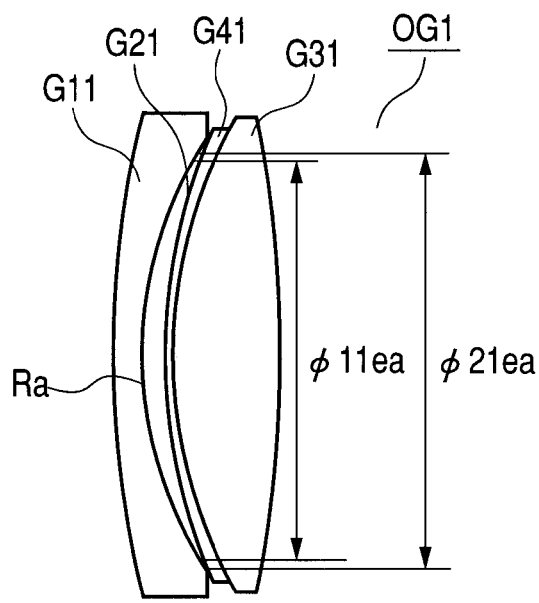
FIG. 3 is a cross sectional view of a relevant portion of a compound lens according to a second embodiment of the present invention.

FIG. 3 is a cross sectional view showing a relevant portion of a compound lens OG1 according to a second embodiment of the present invention. In this embodiment, the first optical element G11 and the third optical element G31 are made of an inorganic glass.

In this embodiment, an additional optical element G41 is cemented between the second optical element G21 and the third optical element G31, and the compound lens OG1 is composed of the four optical elements G11, G21, G31, and G41. The second optical element G21 is made of a UV curing resin and has a meniscus shape.

Figure 4:
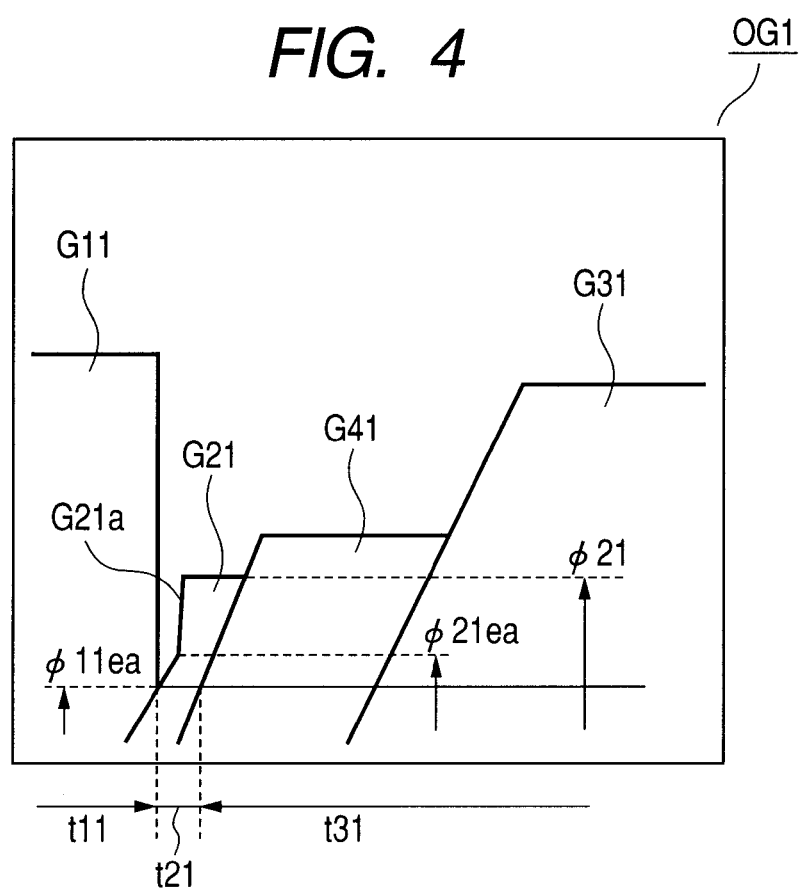
FIG. 4 is an enlarged view showing an edge portion of the compound lens according to the second embodiment of the present invention.

FIG. 4 is an enlarged view showing an edge portion of the compound lens OG1 according to the second embodiment of the present invention in an enlarged manner. In FIG. 4, components equivalent to those shown in FIG. 2 are denoted by the same symbols. In this embodiment, in the region outside the effective surface area of the second optical element G21, the third surface (which is an optically non-effective surface) G21a or the surface of the second optical member G21 that faces the first optical element G11 is planar. This makes the decrease in the thickness of the second optical element G21 in the optical axis direction in the region outside the effective surface area small.

The outside/inside volume ratio of the second optical element G21 in this embodiment is 0.020. Then, the thickness of the second optical element G21 in the optical axis direction in the optically effective surface (with the diameter of the effective surface area $\phi 21ea$) can be made smaller than the thickness of the second optical element C2 in conventional compound lenses that does not have such a shape that the decrease in the thickness in the optical axis direction is made small in the region outside the effective surface area. In consequence, the advantageous effects same as the above-described first embodiment can be achieved.

Third Embodiment

Figure 5:
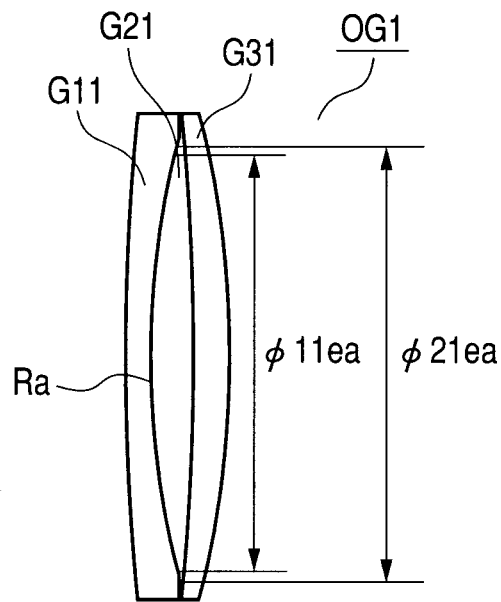
FIG. 5 is a cross sectional view of a relevant portion of a compound lens according to a third embodiment of the present invention.

FIG. 5 is a cross sectional view showing a relevant portion of a compound lens OG1 according to a third embodiment of the present invention. In this embodiment, the first optical element G11 and the third optical element G31 are made of an inorganic glass. The second optical element G21 is made of a mixture in which TiO2 fine particles are scattered in a base synthetic resin at a volume percentage of 20%. The second optical element G21 has a biconvex shape.

Figure 6:
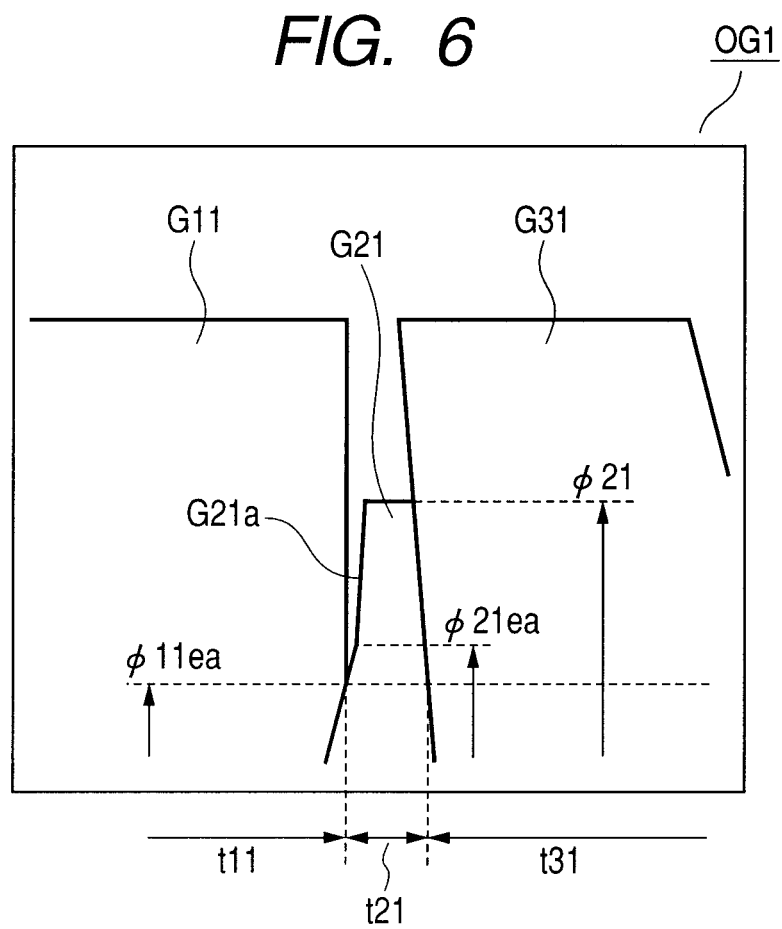
FIG. 6 is an enlarged view showing an edge portion of the compound lens according to the third embodiment of the present invention.

FIG. 6 is an enlarged view showing an edge portion of the compound lens OG1 according to the third embodiment of the present invention in an enlarged manner. In FIG. 6, components equivalent to those shown in FIG. 2 are denoted by the same symbols. In this embodiment, in the region outside the effective surface area of the second optical element G21, the curvature radius of the third surface (which is an optically non-effective surface) G21a or the surface of the second optical member G21 that faces the first optical element G11 is locally changed. This makes the decrease in the thickness of the second optical element G21 in the optical axis direction in the region outside the effective surface area small.

The outside/inside volume ratio of the second optical element G21 in this embodiment is 0.015. Then, the thickness of the second optical element G21 in the optical axis direction in the optically effective surface (with the diameter of the effective surface area ϕ21ea) can be made smaller than the thickness of the second optical element C2 in conventional compound lenses that does not have such a shape that the decrease in the thickness in the optical axis direction is made small in the region outside the effective surface area. In consequence, the advantageous effects same as the above-described first embodiment can be achieved.

Fourth Embodiment

Figure 7:
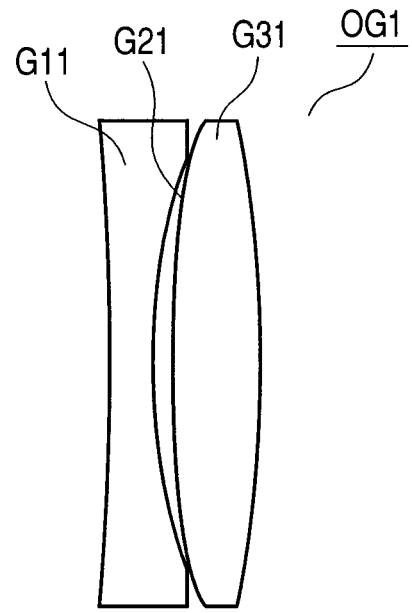
FIG. 7 is a cross sectional view of a relevant portion of a compound lens according to a fourth embodiment of the present invention.

FIG. 7 is a cross sectional view showing a relevant portion of a compound lens OG1 according to a fourth embodiment of the present invention. In this embodiment, the first optical element G11 and the third optical element G31 are made of an inorganic glass. The second optical element G21 is made of a UV curing resin 1 and has a biconvex shape.

Figure 8:
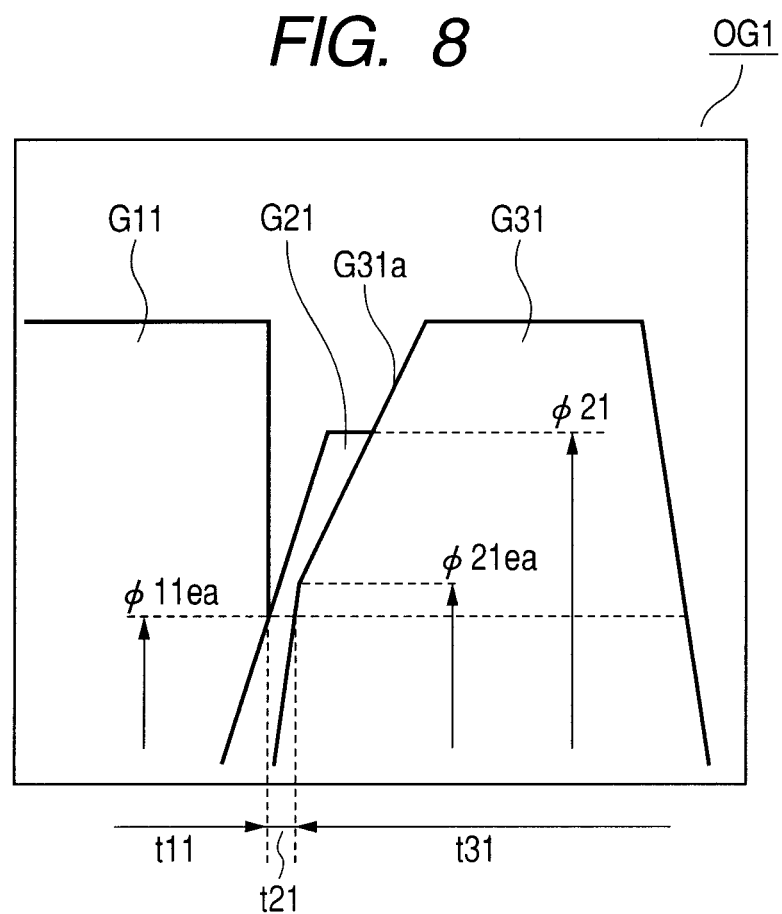
FIG. 8 is an enlarged view showing an edge portion of the compound lens according to the fourth embodiment of the present invention.

FIG. 8 is an enlarged view showing an edge portion of the compound lens OG1 according to the fourth embodiment of the present invention in an enlarged manner. In FIG. 8, components equivalent to those shown in FIG. 2 are denoted by the same symbols. In this embodiment, in the region outside the effective surface area of the second optical element G21, the curvature radius of the fifth surface (which is an optically non-effective surface) G31a or the surface of the third optical element G31 that faces the second optical element G21 is locally changed. This makes the decrease in the thickness of the second optical element G21 in the optical axis direction in the region outside the effective surface area small.

The outside/inside volume ratio of the second optical element G21 in this embodiment is 0.070. Then, the thickness of the second optical element G21 in the optical axis direction in the optically effective surface (with the diameter of the effective surface area ϕ21ea) can be made smaller than the thickness of the second optical element C2 in conventional compound lenses that does not have such a shape that the decrease in the thickness in the optical axis direction is made small in the region outside the effective surface area. In consequence, the advantageous effects same as the above-described first embodiment can be achieved.

Fifth Embodiment

Figure 9:
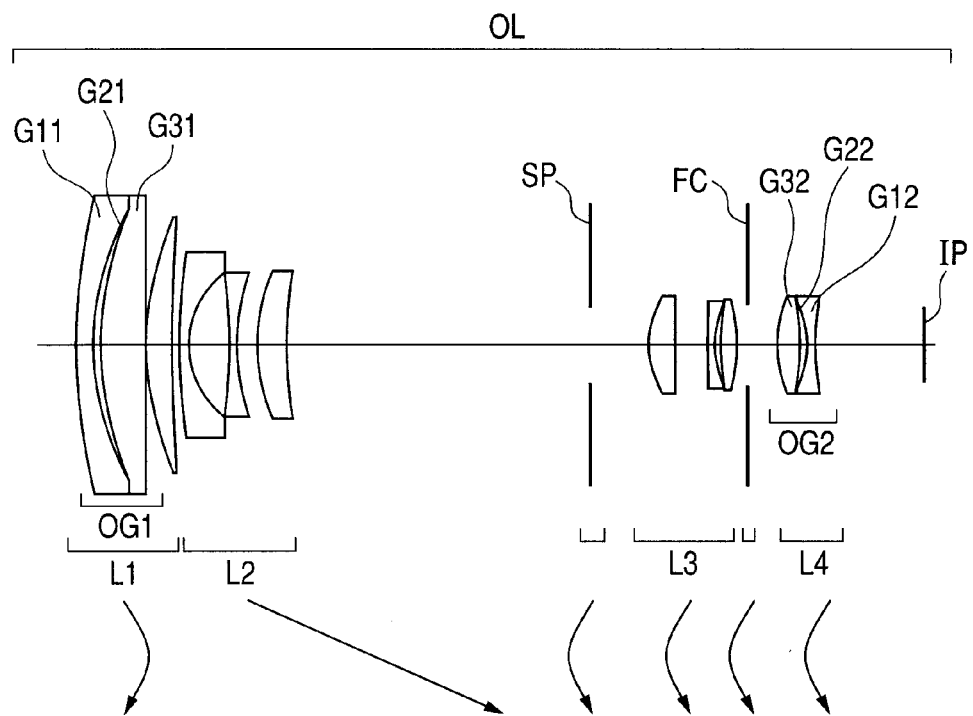
FIG. 9 is a cross sectional view of a relevant portion of a compound lens according to a fifth embodiment of the present invention.

FIG. 9 is a cross sectional view showing a relevant portion of an optical system OL using a compound lens according to a fifth embodiment of the present invention. The optical system according to this embodiment is a four-unit zoom lens having a zoom ratio of approximately 12, which includes, in order form an object side to an image side, a first lens unit L1 having a positive refractive power, a second lens unit L2 having a negative refractive power, a third lens unit L3 having a positive refractive power, and a fourth lens unit L4 having a positive refractive power. The arrows in FIG. 9 illustrate loci of movement of the lens units, a stop SP, and a flare cutter FC during zooming from the wide angle end to the telephoto end. For focusing with a change in the object distance, the fourth lens unit L4 is moved along the optical axis.

The optical system has a first compound lens OG1 provided in the first lens unit L1 and a second compound lens OG2 that constitutes the fourth lens unit L4. In the compound lens OG1 of the first lens unit L1, the first optical element G11 and the third optical element G31 are made of an inorganic glass. The second optical element G21 is made of a UV curing resin 1 and has a meniscus shape having a convex surface facing the object side. In the compound lens OG2 of the fourth lens unit L4, the first optical element G12 and the third optical element G32 are made of an inorganic glass. The second optical element G22 is made of a UV curing resin 1 and has a meniscus shape having a convex surface facing the image side.

Figure 10A:
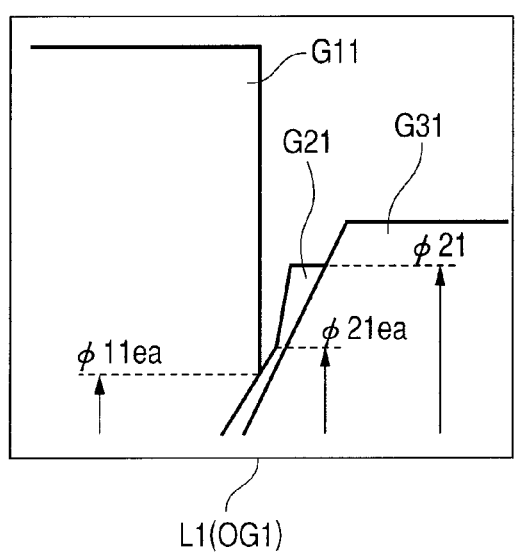
FIGS. 10A and 10B are enlarged views showing an edge portion of the compound lens according to the fifth embodiment of the present invention.

FIG. 10A is an enlarged view showing an edge portion of the first compound lens OG1 used as the first lens unit L1 in the optical system according to the fifth embodiment. In this embodiment, the curvature radius is locally changed in the region of the surface of the second optical element G21 outside the effective surface area. Thus, the decrease in the thickness of the second optical element G21 in the optical axis direction in the region outside the effective surface area is made small.

The outside/inside volume ratio of the second optical element G21 in this embodiment is 0.020. Then, the thickness of the second optical element G21 in the optically effective surface (with the diameter of the effective surface area ϕ21ea) can be made smaller than the thickness of the second optical element C2 in conventional compound lenses that does not have such a shape that the decrease in the thickness in the optical axis direction is made small in the region outside the effective surface area. In consequence, the advantageous effects same as the above-described first embodiment can be achieved.

Figure 10B:
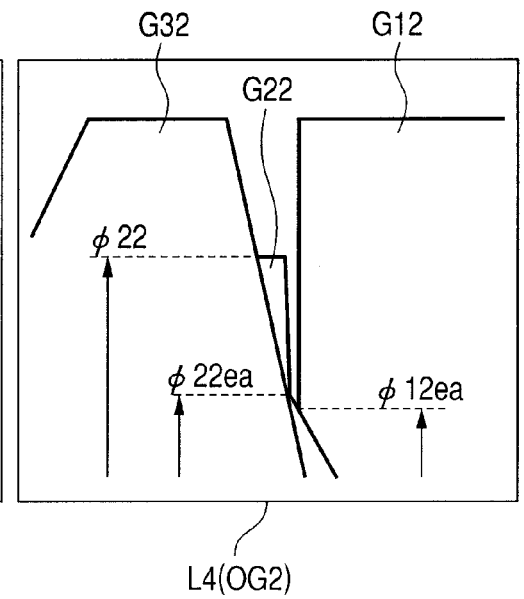

FIG. 10B is an enlarged view showing an edge portion of the second compound lens OG2 used as the fourth lens unit L4 in the optical system according to the fifth embodiment. In this embodiment, the curvature radius is locally changed in the region of the surface of the second optical element G22 outside the effective surface area. Thus, the decrease in the thickness of the second optical element G22 in the optical axis direction in the region outside the effective surface area is made small.

The outside/inside volume ratio of the second optical element G22 in this embodiment is 0.030. Then, the thickness of the second optical element G21 in the optically effective surface (with the diameter of the effective surface area ϕ22ea) can be made smaller than the thickness of the second optical element C2 in conventional compound lenses that does not have such a shape that the decrease in the thickness in the optical axis direction is made small in the region outside the effective surface area. In consequence, the advantageous effects same as the above-described first embodiment can be achieved.

In the fifth embodiment, longitudinal chromatic aberration and lateral chromatic aberration are excellently corrected throughout the zoom range from the wide angle end to the telephoto end by anomalous partial dispersion of the UV curing resin.

Figure 11A:
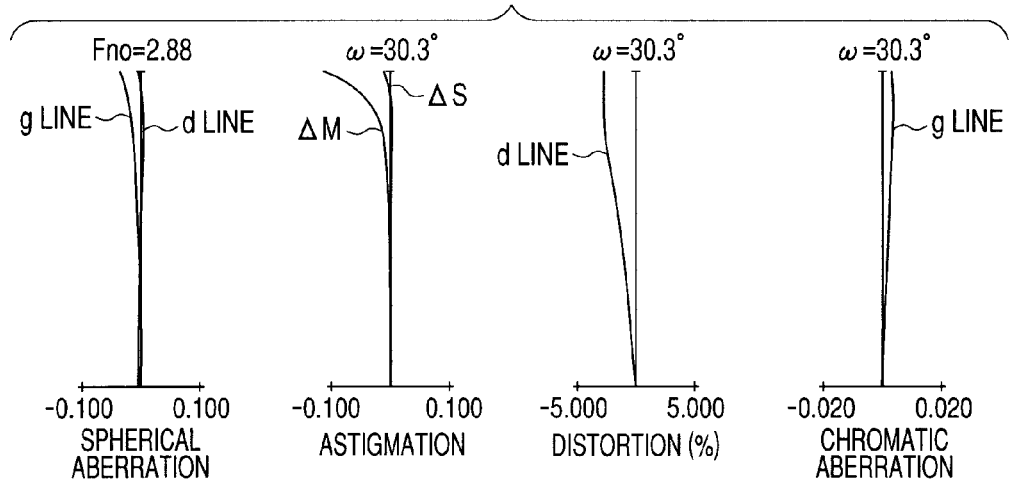
FIGS. 11A, 11B and 11C show aberrations of the optical systems according to the fifth embodiment of the present invention.
Figure 11B:
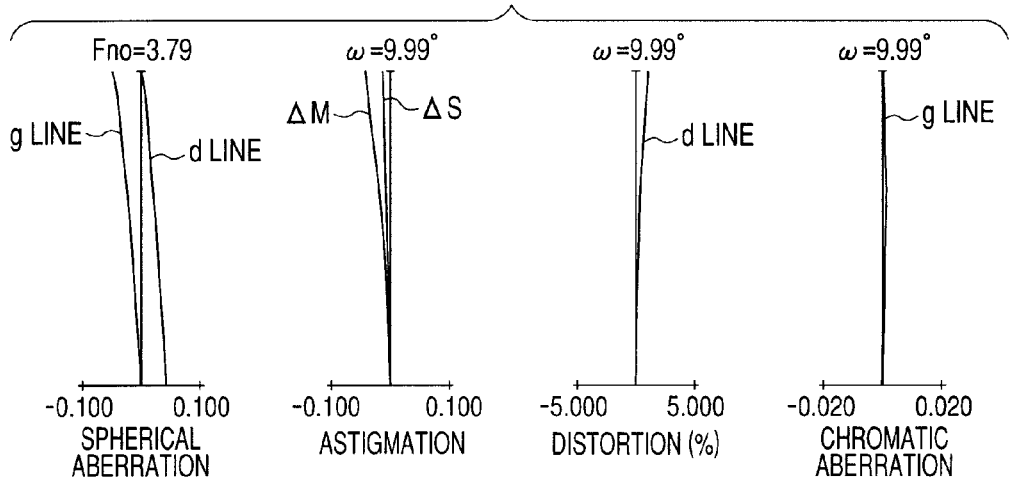
Figure 11C:
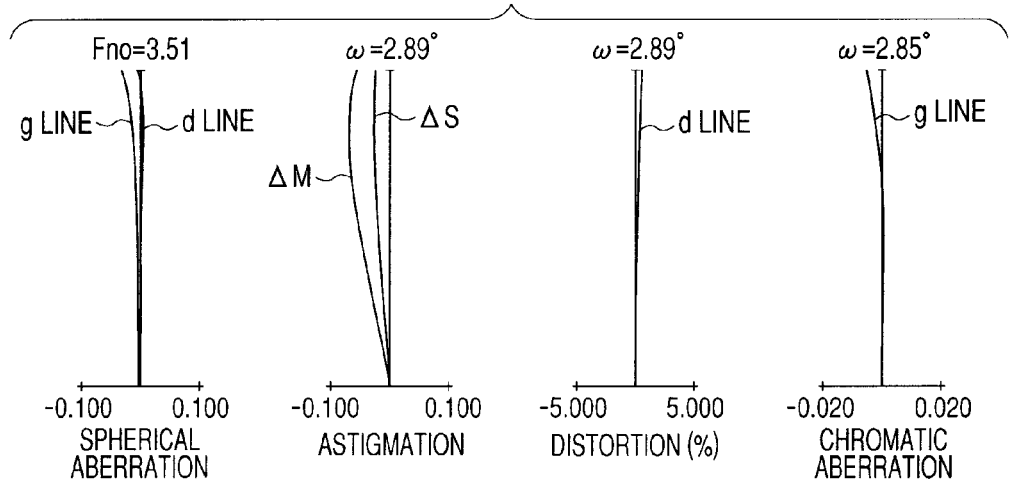

FIGS. 11A, 11B, and 11C show aberrations of the optical system according to the fifth embodiment respectively at the wide angle end, an intermediate zoom position, and the telephoto end. In the fifth embodiment, the diameter of the effective surface area of the first optical element G11 is larger than the diameter of the effective surface area of the third optical element G31. If the lens holding unit such as a lens barrel holds the lens only by the first optical element G11, distortion of the optical surface with expansion or contraction of the second optical element G21 can be prevented from occurring.

Figure 12:
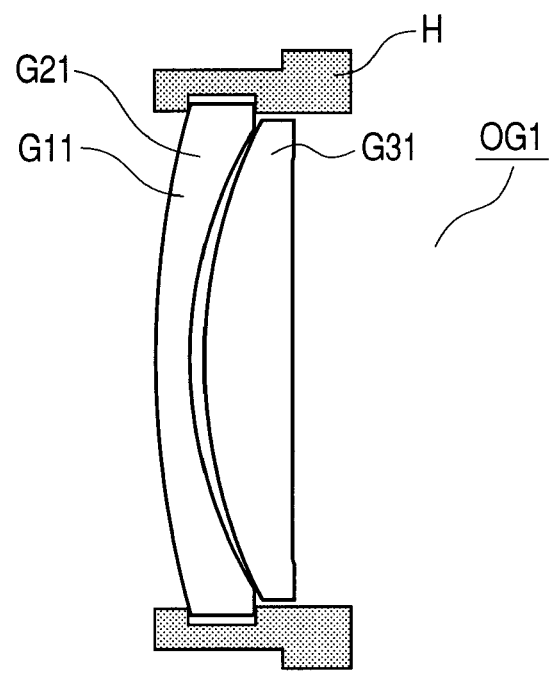
FIG. 12 is a cross sectional view of a relevant portion of a compound lens according to the present invention held by a lens barrel.

FIG. 12 is a cross sectional view of a relevant portion of the compound lens OG1 that is held by a holding unit or a lens barrel H. In FIG. 12, the components the same as the components shown in FIG. 10A are denoted by the same reference symbols.

Although only the first optical element G11 is fixed (or held) by the lens holding unit or the lens barrel H in this embodiment, the present invention is not limited to this. One or both of the first and third optical elements may be fixed to the lens holding means.

In the following, specific numerical data are presented for numerical embodiments 1 to 5 corresponding to the first to fifth embodiments and a prior art. In numerical embodiment 5, data for the compound lens OG1 in the first lens unit L1 are presented as numerical embodiment 5-1, and data for compound lens OG2 in the fourth lens unit L4 are presented as numerical embodiment 5-2. In each numerical embodiment, there are presented the surface number m counted from the light incidence side, the curvature radius rm of the m-th optical surface (the m-th surface), the distance dm between the m-th surface and the (m+1)-th surface on the optical axis, the refractive index ndm of the m-th optical member for the d-line, the Abbe number vdm of the m-th optical member for the d-line, and the diameter of the effective area (or effective surface area) ED of the m-th optical surface (the m-th surface).

Here, the Abbe number vd for the d-line is defined by the following equation:

$vd = (Nd-1)/(NF-NC)$, where NF, Nd, NC are refractive indices for the Fraunhofer's F-line (486.1 nm), d-line (587.6 nm), C-line (656.3 nm) respectively.

In the numerical embodiments, Fno represents the F-number, and ω represents half the angle of view. The aspheric surfaces are expressed by the following equation in terms of the displacement (or distance) x from the surface vertex along the direction parallel to the optical axis and height h from the optical axis along the direction perpendicular to the optical axis:

$$x(h) = \frac{(1/r)h^2}{1 + \sqrt{\{1-(1+k)(h/r)^2\}}} + Bh^4 + Ch^6 + Dh^8 + Eh^{10} + \ldots,$$

where r is the paraxial curvature radius, k is a conic constant, and B, C, D, E, ... are aspheric coefficients. The expression "E±0XX" in the aspheric coefficients stands for "×10$^{\pm xx}$". The values of (φ1ea, φ2ea, and φ2, the refractive indices of the second optical element G2i for the d-line, g-line, C-line, and F-line, the Abbe number, the partial dispersion ratio, and the values associated with conditions (2), (3), and (7) are presented for all the embodiments in Table 1 below.

TABLE 1

| Condition | | prior art | embodiment 1 | embodiment 2 | embodiment 3 | embodiment 4 | embodiment 5 1st lens unit | embodiment 5 4th lens unit |
|---|---|---|---|---|---|---|---|---|
| | φ1jea | 29.0 | 29.0 | 29.0 | 29.0 | 11.0 | 26.3 | 8.9 |
| | φ2jea | 30.4 | 29.3 | 29.3 | 29.3 | 11.2 | 26.6 | 9.0 |
| | φ2j | 30.4 | 30.4 | 30.1 | 30.4 | 12.3 | 27.5 | 10.0 |
| (2) | t2j(φ1jea)/t2j(0) | | 0.083 | 0.146 | 0.113 | 0.166 | 0.084 | 0.036 |
| (3) | t2j(φ1jea)/{t1j(φ1jea) + t3j(φ1jea)} | | 0.015 | 0.034 | 0.075 | 0.026 | 0.012 | 0.008 |
| (7) | φ1jea/φ2j | | 0.954 | 0.964 | 0.954 | 0.900 | 0.956 | 0.890 |
| | nd of 2nd optical element | | 1.6356 | 1.6356 | 1.7088 | 1.6356 | 1.6356 | 1.6356 |
| | ng of 2nd optical element | | 1.6753 | 1.6753 | 1.7599 | 1.6753 | 1.6753 | 1.6753 |
| | nC of 2nd optical element | | 1.6281 | 1.6281 | 1.7003 | 1.6281 | 1.6281 | 1.6281 |
| | nF of 2nd optical element | | 1.6560 | 1.6560 | 1.7331 | 1.6560 | 1.6560 | 1.6560 |

(Numerical Embodiment 1)

| m | r | d | nd | vd | ED |
|---|---|---|---|---|---|
| 1 | ∞ | 1.50 | 1.84666 | 23.8 | 32.20 |
| 2 | 28.533 | 0.00 | | | 29.00 |
| 3* | 28.533 | 1.35 | 1.63429 | 23.3 | 29.30 |
| 4 | 40.000 | 0.00 | | | 29.30 |
| 5 | 40.000 | 4.60 | 1.48749 | 70.2 | 31.60 |
| 6 | ∞ | | | | 31.60 |

| m | local curvature radius | diameter |
|---|---|---|
| 3 | 28.5327 | 0~29.3 |
| | 239.7437 | 29.3~30.4 |

(Numeral Embodiment 2)

| m | r | d | nd | vd | ED |
|---|---|---|---|---|---|
| 1 | 80.000 | 1.50 | 1.84666 | 23.8 | 32.10 |
| 2 | 28.533 | 0.00 | | | 29.00 |
| 3* | 28.533 | 1.45 | 1.63429 | 23.3 | 29.30 |
| 4 | 40.000 | 0.00 | | | 29.30 |
| 5 | 40.000 | 6.50 | 1.48749 | 70.2 | 29.30 |
| 6 | 34.500 | | | | 30.30 |
| 7 | −90.000 | | | | 30.30 |

| m | local curvature radius | diameter |
|---|---|---|
| 3 | 28.5327 | 0~29.3 |
| | ∞ | 29.3~30.08 |

(Numeral Embodiment 3)

| m | r | d | nd | vd | ED |
|---|---|---|---|---|---|
| 1 | 200.000 | 1.40 | 1.8052 | 25.4 | 31.60 |
| 2 | 63.051 | 0.00 | | | 29.00 |
| 3* | 63.051 | 2.50 | 1.7088 | 23.3 | 29.30 |
| 4 | −200.000 | 0.00 | | | 29.30 |
| 5 | −200.000 | 2.20 | 1.6204 | 60.3 | 31.60 |
| 6 | −70.000 | | | | 31.60 |

| m | local curvature radius | diameter |
|---|---|---|
| 3 | 63.0509 | 0~29.3 |
| | 300.0000 | 29.3~30.4 |

(Numeral Embodiment 4)

| m | r | d | nd | vd | ED |
|---|---|---|---|---|---|
| 1 | −80.000 | 1.00 | 1.8340 | 37.2 | 12.80 |
| 2 | 19.848 | 0.00 | | | 11.02 |
| 3 | 19.848 | 0.50 | 1.6343 | 23.3 | 11.23 |
| 4* | 42.000 | 0.00 | | | 11.23 |
| 5* | 42.000 | 2.00 | 1.5174 | 52.4 | 12.80 |
| 6 | −40.000 | | | | 12.80 |

| m | local curvature radius | diameter |
|---|---|---|
| 4 | 42.0000 | 0~11.23 |
| | 14.8400 | 11.23~12.25 |
| 5 | 42.0000 | 0~11.23 |
| | 14.8400 | 11.23~13 |

(Numeral Embodiment 5-1)

| m | r | d | nd | vd | ED |
|---|---|---|---|---|---|
| 1 | 58.801 | 1.80 | 1.8467 | 23.8 | 29.80 |
| 2 | 27.400 | 0.00 | | | 26.30 |
| 3* | 27.400 | 0.78 | 1.6356 | 22.7 | 26.60 |
| 4 | 33.928 | 0.00 | | | 26.60 |
| 5 | 33.928 | 4.50 | 1.6031 | 60.6 | 27.80 |
| 6 | 902.237 | | | | 27.80 |

| m | local curvature radius | diameter |
|---|---|---|
| 3 | 27.4002 | 0~26.6 |
| | 88.2229 | 26.6~27.5 |

(Numeral Embodiment 5-2)

| m | r | d | nd | vd | ED |
|---|---|---|---|---|---|
| 1 | 13.046 | 1.80 | 1.7130 | 53.9 | 10.80 |
| 2 | −24.861 | 0.00 | | | 8.90 |
| 3 | −24.861 | 0.78 | 1.6356 | 22.7 | 9.00 |
| 4* | −9.512 | 0.00 | | | 9.00 |
| 5 | −9.512 | 0.80 | 1.6727 | 32.1 | 10.80 |
| 6 | 20.974 | | | | 10.80 |

| m | local curvature radius | diameter |
|---|---|---|
| 4 | −24.8608 | 0~9 |
| | 131.0401 | 9~10 |

(Numeral Embodiment 5)

| m | r | d | nd | vd | ED |
|---|---|---|---|---|---|
| 1 | 58.801 | 1.80 | 1.8467 | 23.8 | 28.60 |
| 2 | 27.400 | 0.78 | 1.6356 | 22.7 | 25.85 |
| 3 | 33.928 | 4.50 | 1.6031 | 60.6 | 25.79 |
| 4 | 902.237 | 0.15 | | | 24.97 |
| 5 | 30.468 | 2.60 | 1.6204 | 60.3 | 24.38 |
| 6 | 163.714 | (variable) | | | 24.15 |
| 7 | 62.482 | 0.90 | 1.7725 | 49.6 | 17.42 |
| 8 | 8.767 | 3.65 | | | 13.43 |
| 9 | −56.585 | 0.75 | 1.7725 | 49.6 | 13.37 |
| 10 | 19.670 | 2.40 | | | 13.02 |
| 11 | 18.101 | 3.00 | 1.9229 | 18.9 | 13.76 |
| 12 | 42.728 | (variable) | | | 13.22 |
| 13(stop) | ∞ | (variable) | | | 7.30 |
| 14* | 8.433 | 2.70 | 1.5891 | 61.1 | 9.00 |
| 15 | 413.602 | 3.32 | | | 8.60 |
| 16 | 126.728 | 0.70 | 1.9037 | 31.3 | 8.10 |
| 17 | 8.905 | 0.60 | | | 7.90 |
| 18 | 18.544 | 1.70 | 1.4875 | 70.2 | 8.10 |
| 19 | −16.066 | (variable) | | | 8.40 |
| 20 | ∞ | (variable) | | | 8.30 |
| 21 | 13.046 | 2.30 | 1.7130 | 53.9 | 9.01 |
| 22 | −24.861 | 0.73 | 1.6356 | 22.7 | 8.79 |
| 23 | −9.512 | 0.80 | 1.6727 | 32.1 | 8.78 |
| 24 | 20.974 | (variable) | | | 8.33 |
| image plane | ∞ | | | | |

Aspheric Surface Data

14th surface

K = −6.56135e−001 A4 = 7.61281e−006 A6 = 2.28418e−007
A8 = −1.80542e−009 A10 = 2.02947e−010

Various Data
zoom ratio: 11.59

| | wide angle end | intermediate position | telephoto end |
|---|---|---|---|
| focal length | 6.15 | 20.45 | 71.28 |
| F number | 2.88 | 3.79 | 3.51 |
| angle of view | 0.00 | 0.00 | 0.00 |
| image height | 3.60 | 3.60 | 3.60 |
| full lens length | 86.55 | 84.64 | 84.90 |
| BF | 11.40 | 17.13 | 11.14 |
| d6 | 0.80 | 14.23 | 28.67 |
| d12 | 31.00 | 11.18 | 1.36 |
| d13 | 5.87 | 3.13 | 1.42 |
| d19 | 1.10 | 1.55 | 4.37 |
| d20 | 3.00 | 4.05 | 4.57 |
| d24 | 11.40 | 17.13 | 11.14 |

-continued

| | | | |
|---|---|---|---|
| entrance pupil position | 21.26 | 57.65 | 201.51 |
| exit pupil position | −27.93 | −23.64 | −27.57 |
| front principal point position | 26.45 | 67.84 | 141.56 |
| rear principal point position | 5.25 | −3.32 | −60.14 |

Data of Zoom Lens Units

| unit | first surface | focal length | lens unit length | front principal point position | rear principal point position |
|---|---|---|---|---|---|
| 1 | 1 | 46.800 | 9.83 | 2.63 | −3.48 |
| 2 | 7 | −10.280 | 10.70 | 0.92 | −7.66 |
| 3 | 14 | 22.760 | 9.02 | −2.50 | −9.31 |
| 4 | 21 | 38.530 | 3.83 | −2.91 | −4.81 |

Data of Single Lenses

| lens | first surface | focal length |
|---|---|---|
| 1 | 1 | −62.240 |
| 2 | 2 | 214.190 |
| 3 | 3 | 58.340 |
| 4 | 5 | 59.890 |
| 5 | 7 | −13.300 |
| 6 | 9 | −18.810 |
| 7 | 11 | 32.150 |
| 8 | 14 | 14.580 |
| 9 | 16 | −10.630 |
| 10 | 18 | 17.950 |
| 11 | 21 | 12.310 |
| 12 | 22 | 23.800 |
| 13 | 23 | −9.630 |

(Prior Art)

| m | r | d | nd | vd | ED |
|---|---|---|---|---|---|
| 1 | ∞ | 1.50 | 1.8467 | 23.8 | 32.20 |
| 2 | 28.533 | 0.00 | | | 29.00 |
| 3 | 28.533 | 1.50 | 1.6343 | 23 | 30.40 |
| 4 | 40.000 | 0.00 | | | 30.40 |
| 5 | 40.000 | 4.60 | 1.6031 | 70.2 | 31.60 |
| 6 | ∞ | | | | 31.60 |

Next, a digital still camera as an embodiment of the optical apparatus according to the present invention that uses an optical system according to the present invention as an image taking optical system will be described with reference to FIG. 13.

Figure 13:
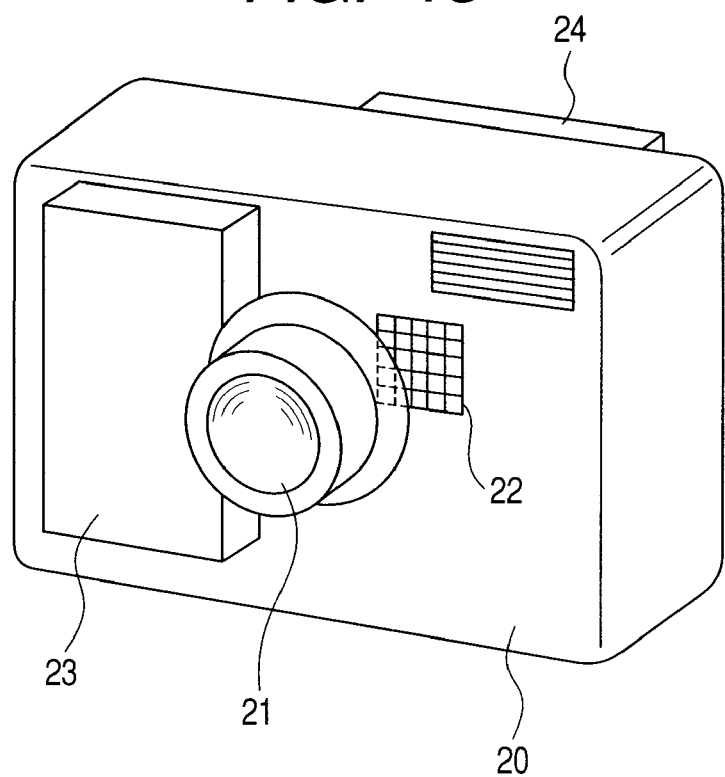
FIG. 13 is a diagram schematically showing a relevant portion of an optical apparatus (image pickup apparatus) according to the present invention.

The digital still camera shown in FIG. 13 includes a camera body 20 and an image taking optical system designed as an optical system according to the present invention. In the camera body 20 is provided a solid state image pickup element 22 (photoelectric transducer element) such as a CCD sensor or a CMOS sensor that receives an optical image of an object formed by the image taking optical system 21. The digital still camera has a memory 23 in which information corresponding to the object image obtained by photoelectric conversion by the image pickup element 22 is stored. The digital still camera also has a finder 24 such as a liquid crystal display panel with which the image formed on the solid state image pickup element 22 can be viewed. As the optical system according to the present invention is applied to an image pickup apparatus such as a digital still camera, an image pickup apparatus that is small in size and has high optical performance is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-267152, filed Nov. 25, 2009, which is hereby incorporated by reference herein in its entirety.

What is claimed is:

1. A compound lens comprising three or more optical elements, including first, second, and third optical components, that are cemented together into an integral component, wherein the material of the second optical element is an organic composite material, the first optical element is cemented to one surface of the second optical element, the third optical element is disposed remotest from the first optical element in an optical axis, the following conditions are satisfied:

$$\phi 1ea \leq \phi 2ea < \phi 2,$$

$$t2(\phi 1ea)/t2(0) < 1.0, \text{ and}$$

$$t2(\phi 1ea)/\{t1(\phi 1ea) + t3(\phi 1ea)\} < 0.20,$$

where $\phi 1ea$ is a diameter of an effective surface area of the first optical element on the cemented surface between the first optical element and the second optical element, $\phi 2ea$ is a diameter of an effective surface area of the second optical element, $\phi 2$ is an outer diameter of the second optical element, and $ti(\phi)$ is a distance between optically effective surfaces of the i-th optical element (i=1, 2, 3) along the optical axis at diameter $\phi$, and the second optical element has such a shape that a decrease in the distance between its optically effective surfaces along the optical axis is small in a region outside the effective surface area.

2. A compound lens according to claim 1, wherein the compound lens satisfies the following differential formula:

$$dt2(\phi 2ea)/d\phi < dt2(\phi 2ext)/d\phi,$$

where $\phi 2ext$ is a diameter of the second optical element in the region outside the effective surface area ($\phi 2ea < \phi 2ext \leq \phi 2$).

3. A compound lens according to claim 1, wherein the cemented surface between the first optical element and the second optical element has a shape having different curvature radii in a region inside the effective surface area and a region outside the effective surface area.

4. A compound lens according to claim 1, wherein the compound lens satisfies the following condition:

$$\phi 1ea/\phi 2 \geq 0.80.$$

5. An optical system comprising at least one compound lens, the at least one compound lens including three or more optical elements, including first, second, and third optical components, that are cemented together into an integral component, wherein the material of the second optical element is an organic composite material, the first optical element is cemented to one surface of the second optical element, the third optical element is disposed remotest from the first optical element in an optical axis, the following conditions are satisfied:

$$\phi 1ea \leq \phi 2ea < \phi 2,$$

$$t2(\phi 1ea)/t2(0) < 1.0, \text{ and}$$

$$t2(\phi 1ea)/\{t1(\phi 1ea) + t3(\phi 1ea)\} < 0.20,$$

where $\phi 1ea$ is a diameter of an effective surface area of the first optical element on the cemented surface between the first optical element and the second optical element, $\phi 2ea$ is a diameter of an effective surface area of the second optical element, $\phi 2$ is an outer diameter of the second optical element, and ti($\phi$) is a distance between optically effective surfaces of the i-th optical element (i=1, 2, 3) along the optical axis at diameter $\phi$, and the second optical element has such a shape that a decrease in the distance between its optically effective surfaces along the optical axis is small in a region outside the effective surface area.

6. An optical system according to claim 5, wherein either one of the first and third optical elements is fixed by a lens holding unit.

7. An optical apparatus comprising an optical system according to claim 5 and a photoelectric transducer element that receives an image formed by the optical system.

8. A method of manufacturing a compound lens, the compound lens including three or more optical elements, including first, second, and third optical components, that are cemented together into an integral component, wherein the material of the second optical element is an organic composite material, the first optical element is cemented to one surface of the second optical element, the third optical element is disposed remotest from the first optical element in an optical axis, the following conditions are satisfied:

$$\phi 1ea \leq \phi 2ea < \phi 2,$$

$$t2(\phi 1ea)/t2(0) < 1.0, \text{ and}$$

$$t2(\phi 1ea)/\{t1(\phi 1ea)+t3(\phi 1ea)\} < 0.20,$$

where $\phi 1ea$ is a diameter of an effective surface area of the first optical element on the cemented surface between the first optical element and the second optical element, $\phi 2ea$ is a diameter of an effective surface area of the second optical element, $\phi 2$ is an outer diameter of the second optical element, and ti($\phi$) is a distance between optically effective surfaces of the i-th optical element (i=1, 2, 3) along the optical axis at diameter $\phi$, and the second optical element has such a shape that a decrease in the distance between its optically effective surfaces along the optical axis is small in a region outside the effective surface area, the method including the steps of:

a step of forming the second optical element on an effective surface of an optical element other than the first optical element; and a step of cementing the first lens element to an effective surface of the second optical element to which no optical element other than the first optical element is cemented.

* * * * *